Nov. 5, 1935.  B. JASSOY  2,019,818
BAKERY MACHINERY
Filed Nov. 9, 1932
Fig. 1.
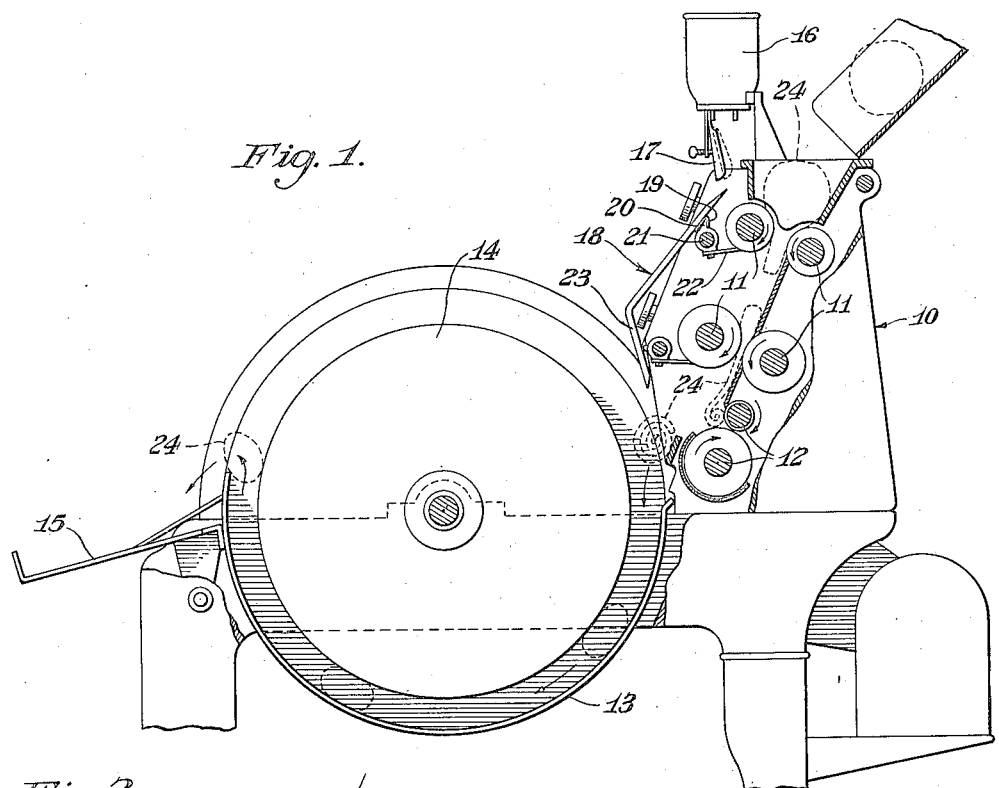
Fig. 2.
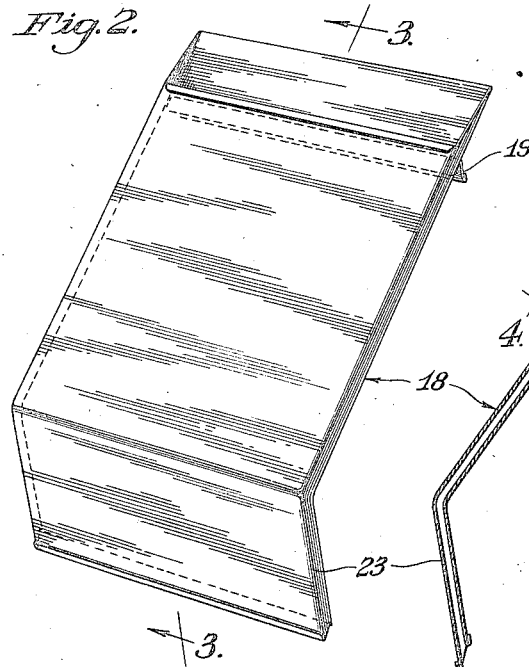
Fig. 3.
Fig. 4.
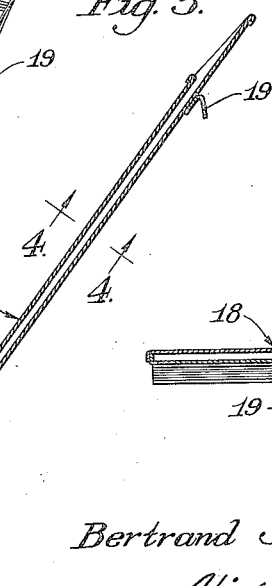
Bertrand Jassoy, INVENTOR
BY Victor J. Evans & Co.
HIS ATTORNEYS Patented Nov. 5, 1935

2,019,818

UNITED STATES PATENT OFFICE 2,019,818

BAKERY MACHINERY

Bertrand Jassoy, Decatur, Ill., assignor to Purity Bakeries Service Corporation, Chicago, Ill., a corporation of Delaware Application November 9, 1932, Serial No. 641,891

1 Claim. (Cl. 107—7)

This invention relates to certain novel improvements in bakery machinery, and has for its principal object the provision of an improved construction of this character which will be highly efficient in use and economical in manufacture.

This invention relates to bakery machinery and, more particularly, to moulders. In these machines the dough is directed between pairs of sheeting rolls, then between a pair of curling rolls, and then into the compression drum. It has been the customary practice heretofore in the art to sift flour onto the dough as it starts on its way through the sheeting and curling rolls of the moulder to prevent the dough from sticking to the rolls and to the compression drum and for reasons well known to persons skilled in the art. This practice of dusting or sifting flour onto the dough as it starts on its way through the sheeting and curling rolls of the moulder has not been satisfactory; it having been learned from experience in the art that when the flour is dusted onto the dough as it starts through the sheeting and curling rolls the pressure of the sheeting rolls on the dough forces a considerable amount of the flour from the surface of the dough into the interior thereof where it is embedded. This causes undesirable results in the baked dough, the embedded flour remaining unbaked in the interior of the baked dough and imparting an undesirable texture thereto, while likewise decreasing the palatability of the baked article. The curling action of the curling rolls also winds a considerable amount of the dusted flour into the interior of the moulded and curled dough and adds to the generally undesirable aforementioned results caused by the flour embedded in the dough by the sheeting rolls.

It is, therefore, an object of this invention to overcome the aforementioned and other difficulties of the prior art devices. To this end I provide an attachment for a dough moulder or moulding machine by means of which flour may be dusted or sifted onto the dough after it leaves the curling rolls and as it starts into the compression drum.

Other objects will appear hereinafter.

The invention consists in the novel combination and arrangement of parts to be hereinafter described and claimed.

The invention will be best understood by reference to the accompanying drawing, showing the preferred form of construction and in which:

Fig. 1 is a view, partly in section and partly in side elevation, showing a typical moulder and illustrating a preferred form of my new attachment associated therewith;

Fig. 2 is a perspective view of the new attachment;

Fig. 3 is a sectional view of the same on line 3—3 in Fig. 2; and

Fig. 4 is a sectional view of the same on line 4—4 in Fig. 3.

In the drawing, a typical moulder is generally indicated at 10 and comprises pairs of dough-sheeting rolls 11, curling rolls 12, compression drum or bed 13, the compression roll 14, delivery chute 15, and flour container 16 having a conventional and adjustable delivery or dispensing valve 17 associated therewith.

The prior art practice has been to dust the flour from the container 16 onto the dough as the same starts on its way through the moulder 10 between the sheeting rolls 11. This practice has not been satisfactory because the pressure exerted on the dough as it passes between the sheeting rolls 11 forces a considerable amount of the flour, thus dusted onto the dough, into the interior of the dough wherein it is thus embedded, and remains unbaked, causing an undesirable effect in the texture of the baked article and decreasing the palatability of the same. Furthermore, in this prior art practice the curling rolls 12 wind a considerable amount of the dusted flour into the sheeted dough and objectionably enhance the aforementioned undesirable effects of the sheeting rolls upon the dusted flour. In addition to the above-mentioned undesirable effects that follow from the prior art practice, there is the additional disadvantage that when the flour is dusted onto the unsheeted dough before it enters the sheeting rolls there is not enough of the thus dusted flour left upon the dough when it reaches the compression drum or bed to prevent the sheeted and curled dough from sticking to the compression roll and drum as it passes through the latter.

To overcome the aforementioned and other difficulties of the prior art, I provide, in practicing the present invention, means in the form of a chute for directing the flour from the container 16 onto the dough as the latter emerges from the curling rolls 12 and passes into the compression drum 13.

This chute 18 may be made of any suitable material, as of metal, for example, and by any desired method. A flange 19 is attached to the chute 18 on the underside of the same and extends transversely thereacross and the chute 18 may be placed in position on the moulder in any suitable or convenient manner, as by attaching the flange 19 to an upstanding flange 20 formed on the support 21 for the sheeting roll scraper 22.

The chute 18 has an angled end portion 23 which makes an obtuse angle with the main extent of the chute 18 and in the use of the attachment this angled end portion 23 is positioned, substantially vertically, as shown in Fig. 1, while the main extent of the chute 18 extends at an acute angle relative to the horizontal.

In use, the delivery valve 17 is adjusted to allow a predetermined flow of flour out of the container or box 16 and this valve 17 directs the flour onto the upper end portion of the main extent of the chute 18. The flour then falls by gravity down the main extent of the chute 18 and is then guided by the angled end portion 23 of the chute onto the sheeted and rolled dough 18 just after the same leaves the curling rolls 12 and as it starts into the compression drum or bed 13.

In this manner the sheeted and curled dough 18 is properly and sufficiently dusted to assume its passage through the compression drum or bed 13 without sticking to the same or to the compression roll 14; and, moreover, when the dusting is carried out according to the present invention the flour is not embedded in, nor wound into the dough, as in the prior art practice, and hence neither damages the texture nor decreases the palatability of the completed baked dough article; and thus the aforementioned and other prior art difficulties that are experienced when the flour is dusted onto the unsheeted dough, as it enters the sheeting rolls, are eliminated.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claim.

Having thus described my invention what I claim as new and desire to protect by Letters Patent is:

The combination with a bakery dough moulding machine having sheeting rolls, curling rolls, and a compression device, of a flour container arranged above said rolls and device having a dispensing valve, and a chute for directing flour from said valve onto the dough after the latter emerges from the curling rolls and before it passes into the compression device, said chute having its main extent arranged at an acute angle to the vertical and having an angled end portion terminating above and between the sheeting rolls and the compression device.

BERTRAND JASSOY.